C. DUMELIN.
VEHICLE TOP.
APPLICATION FILED DEC. 16, 1921.
1,437,499.
Patented Dec. 5, 1922.
3 SHEETS—SHEET 1.
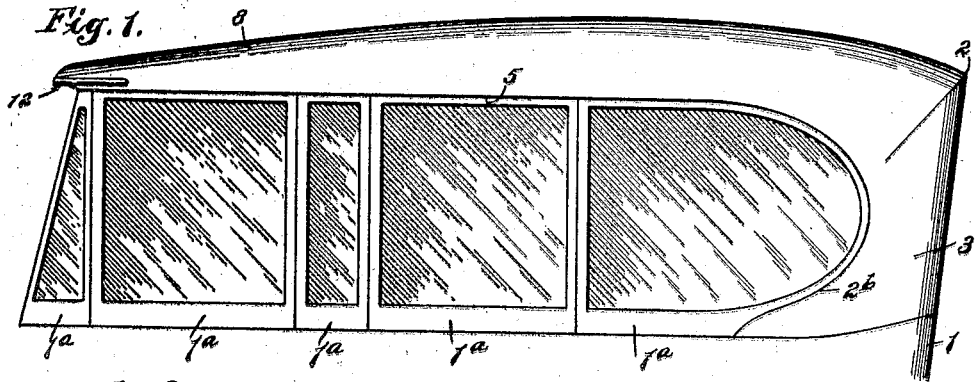
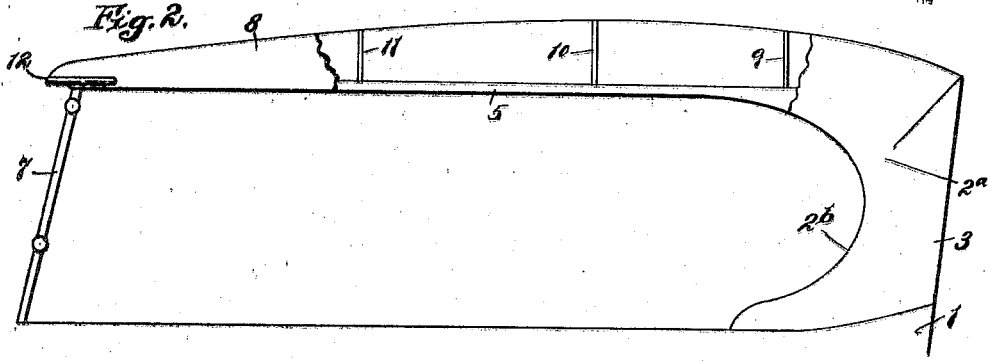
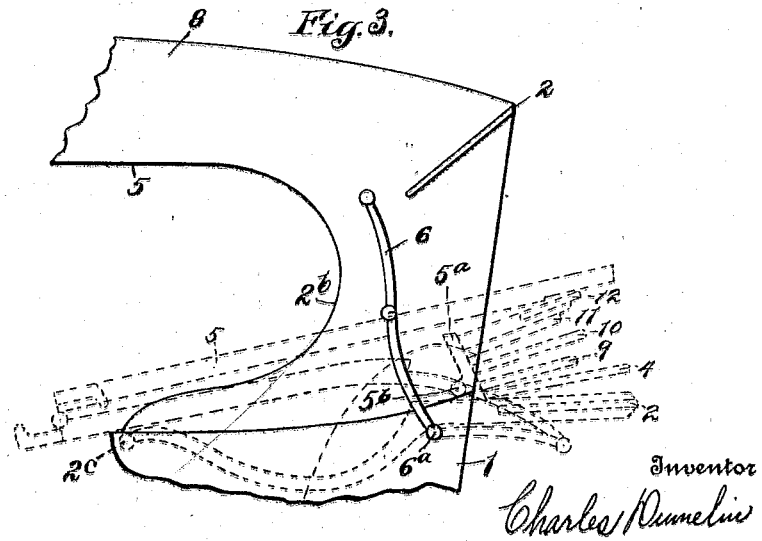
Inventor
Charles Dumelin
By
Thd C Billman  Attorney

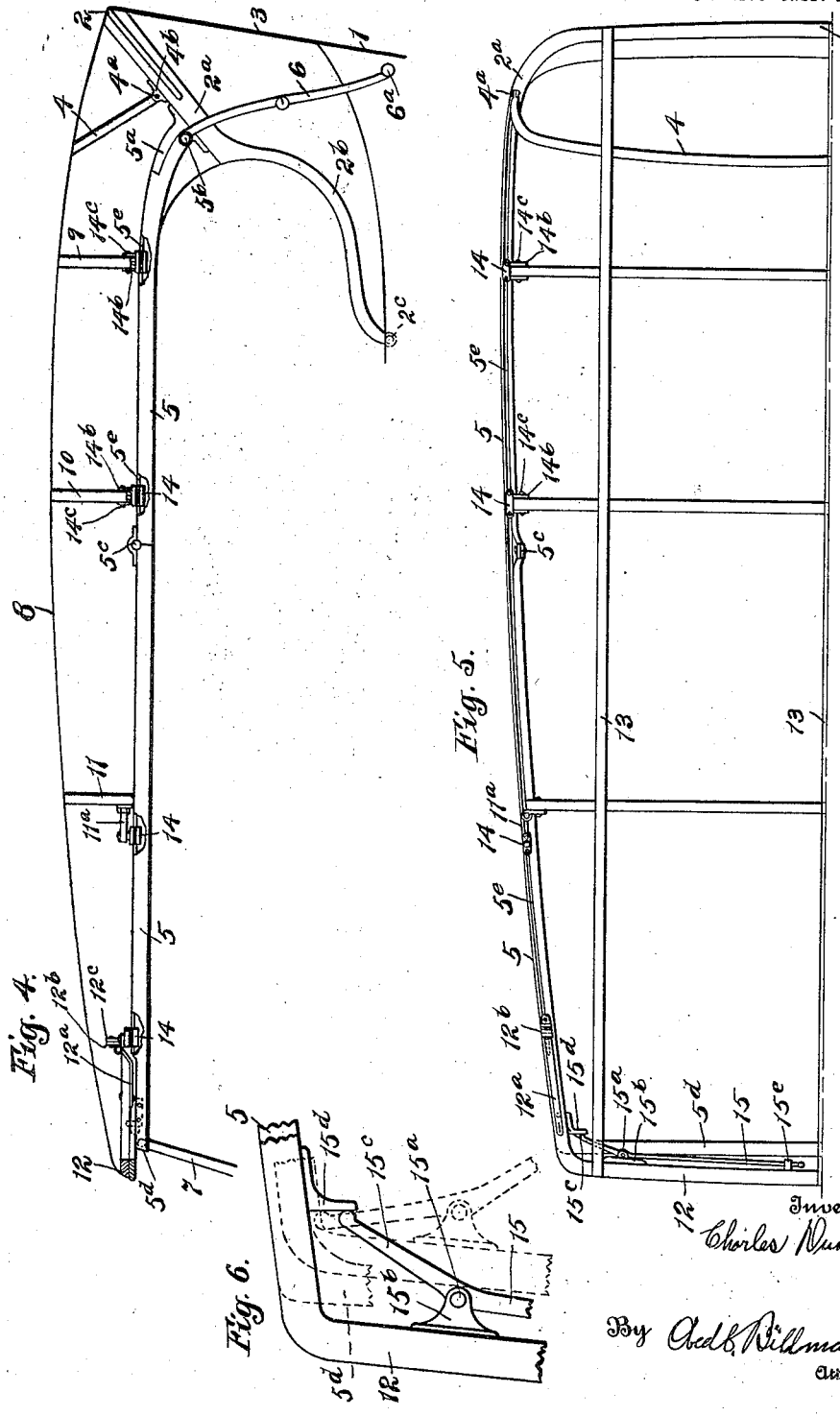

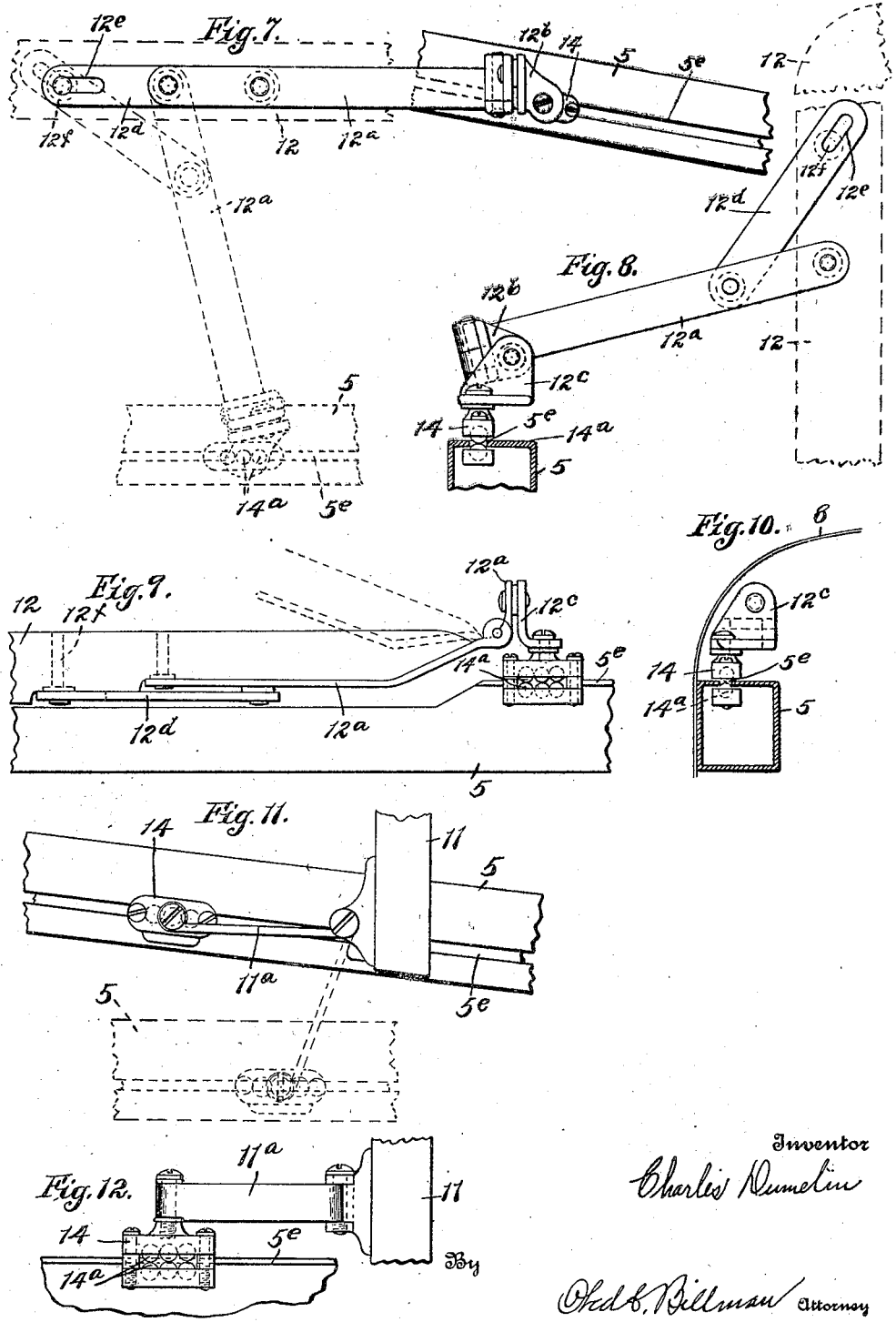

Patented Dec. 5, 1922.

1,437,499

UNITED STATES PATENT OFFICE.

CHARLES DUMELIN, OF LAKEWOOD, OHIO.

VEHICLE TOP.

Application filed December 16, 1921. Serial No. 522,763.

*To all whom it may concern:*

Be it known that I, CHARLES DUMELIN, a citizen of Switzerland, residing at Lakewood, in the county of Cuyahoga and State of Ohio, have invented certain new and useful Improvements in Vehicle Tops, of which the following is a specification.

My invention relates to improvements in vehicle tops, and more particularly to a readily foldable and convertible top for motor vehicles whereby a vehicle equipped with the improved top may be readily and quickly converted into either a closed car or an open car, as desired, or may be collapsed and folded and made to assume a position at the rear of the vehicle body when the protection afforded by the top is not necessary or desired.

The primary object of the invention is to provide a generally improved vehicle top of the class mentioned which will be exceedingly simple in construction, cheap of manufacture, and efficient in use.

A further and very important object is the provision of an improved vehicle top having a main or rear approximately U-shaped top supporting bow, the sides of the latter being provided with a pair of collapsible top rails extending forwardly and curved to conform to the contour of the subjacent side walls of the vehicle body, together with floating bows slidably connected to said top rails and adapted to be moved rearwardly thereon and gathered in front of said U-shaped main bow after which the top rails may be collapsed or folded upon themselves at the rear of the vehicle body when protection afforded by the top is not necessary or desired.

A still further object is the provision of a relatively fixed top support adapted to carry the front of the vehicle top, the latter being provided with a relatively movable front bow, together with improved means between the latter and the relatively fixed top support for initially moving said front bow to finally stretch the top material longitudinally and for maintaining and locking the latter in such stretched position, or if desired, unlocking such front bow preparatory to collapsing the top.

With the above mentioned and other ends in view, the invention consists in the novel construction, arrangement, and combination of parts illustrated in one of its embodiments in the accompanying drawings, and particularly pointed out in the appended claims.

Referring to the drawings, forming a part of this specification, Figure 1 is a side elevation of a vehicle top constructed in accordance with this invention and equipped with the necessary removable side panels for converting the vehicle into a closed car.

Fig. 2, a side elevation of the same with the side panels removed for use as an open car, a portion of the top covering being broken away for the purpose of clearer illustration of the top supporting frame parts.

Fig. 3, a fragmentary side elevation of the rear portion of the vehicle top, the dotted lines indicating the relative position of the gathered or collapsed main and floating bows and top side rails as they appear when the top is fully collapsed.

Fig. 4, a side elevation of the same, the top covering being removed and shown merely in outline for the purpose of clearer illustration of the top supporting bows and frame work.

Fig. 5, a fragmentary top plan view of the same, and illustrating in particular the relative position of the parts when the top is stretched and the front bow is locked in position, the right hand locking lever being shown in locked position.

Fig. 6, a fragmentary top plan view of the relatively fixed and movable cross bow members at the front of the vehicle top in locked position, the dotted lines indicating the relative position of the parts upon the initial movement of the front bow to stretch the top and before locking the latter in stretched or normal position.

Fig. 7, a fragmentary top plan view of the swivelling linked connections between the ends of the front floating bow and the collapsible top rails, the dotted lines indicating the relative position of the parts when the widest part of the top rails is reached as the bow is moved rearwardly in the bow gathering and top folding operation.

Fig. 8, a rear view of the same when the front floating bow is elevated and the wider portion of the top rail is reached.

Fig. 9, a fragmentary side elevation of the front portion of the top rail and folded front bow, the dotted line indicating an intermediate position of the front bow.

Fig. 10, a rear view of the same and indicating the relative position of the top rail and links beneath the top covering.

Fig. 11, a fragmentary top plan view of the link connections between the second floating bow and top rail, the dotted lines indicating the relative position of the parts when the second bow has been shifted to a wider portion of the top rail.

Fig. 12, a side elevation of the same.

Similar numerals of reference designate like parts throughout all the figures of the drawings. The motor vehicle body 1, may be of any suitable and convenient form or type and hence such body is indicated in outline and in the conventional manner as it should be appreciated that my improved top is no way limited to use with any specific form of vehicle body, it being understood that the general outline and contour of the top will be modified to conform with the general form and contour of the vehicle body and to suit the designer of the body and top in each particular case. In order, however, to adapt the open sides of the top to receive side panels 1ª, for converting the vehicle into a car of the closed type as shown in Fig. 1 of the drawings, suitable top rails are provided which extend forwardly from the main or rear top supporting bow, said top rails being curved outwardly to conform to the subjacent curvature or "side sweep" of the sides of the vehicle body, as shown most clearly in Fig. 5 of the drawings.

Referring to the improved top, it will be seen that I provide a main or rear top supporting bow 2, said bow 2, in the present instance, being of the usual U-shaped form having the substantialy horizontal top portion and provided with side members 2ª, said side members 2ª, in the present instance, terminating in curved arm portions 2ᵇ, pivotally connected to the sides of the vehicle body at 2ᶜ. The main top supporting bow 2 is adapted to support the back curtain or section 3, and the top of the bow 2 is provided, in the present instance, with a floating pivotally connected cross bow 4, which bow 4, in the present instance, is pivotally connected at 4ª, in the bearing brackets 4ᵇ.

The sides 2ª of the main bow are provided with stub arms or brackets 5ª. The stub arms or brackets 5ª form a pivot bearing for a pivot 5ᵇ, adapted to pivotally support the forwardly extending top rails 5. The main top supporting bow 2, together with the top rails 5 and the various cross bows, are adapted to be supported in their normal elevated or up position by means of the top props 6, which may be of the usual construction and pivotally connected to the vehicle body 1 at 6ª.

As a means of folding or collapsing the top rails 5 when it is desired to collapse the top to the position shown by dotted lines in Fig. 3 of the drawings, the top rails are pivotally connected intermediate thereof by means of suitable hinge connections 5ᶜ, said top rails extending forwardly in a curved direction to conform to the curvature or "side sweep" of the subjacent vehicle body and terminating at their front in a curved cross member 5ᵈ, adapted to be detachably secured to the upper ends of the oppositely disposed upright standards 7, to thereby hold the front of the top in proper position relative to the body and prevent lateral movement of said front portion which standards commonly support a windshield between them and which standards 7 conjointly with the front portions of the top rails 5 form a relatively fixed support for the front end of the top when the latter is in its up position as hereinafter referred to.

As a means of supporting and collapsing the top covering 8, relative to the top rails 5, and particularly as a means of collapsing and extending said top covering prior to the collapsing and immediately following the extending of said top rails 5, I provide a plurality of floating cross bows 9, 10, 11 and 12 suitably spaced longitudinally of the top covering, said cross bows, in the present instance, being arranged to assume their properly spaced positions by means of longitudinally extending strips 13, as shown most clearly in Fig. 5 of the drawings.

As a means of conveniently connecting the ends of said cross bows to the top rails 5 whereby such cross bows may be readily moved rearwardly and gathered together in collapsed position, as hereinafter more fully referred to, the top rails are provided with guide slots 5ᵉ, adapted to receive and guide suitable bearing brackets 14, provided with suitable anti-friction elements, such for example,—as the balls 14ª, arranged in the connected members of the brackets 14 and adapted to co-operate with the inner and outer portions of the guide slots, as shown most clearly in Figs. 8 to 12, inclusive of the drawings.

The rear cross bows 9 and 10 are connected to the bearing brackets 14 by means of relatively fixed bearing lugs 14ᵇ, and cross bearing pins 14ᶜ, the flexibility in the ends of such bows 9 and 10 being sufficient to permit such bows to be passed rearwardly in the guide slots 5ᵉ of the top rails, and as a means of variably connecting the front floating bows 11 and 12 to the top rails, said cross bows are provided with swivelling links 12ª and 11ª, respectively. In order to permit the front floating bow 12 to be initially raised from its horizontally extending locked position when released by the top stretching and front bow locking mechanism hereinafter referred to, the front swivelling links 12ª are adapted to be given a compound movement through a hinge conection with a hinge member 12ᵇ, having a swivel connection with a second hinge or bracket member 12°, the latter being pivotally connected to the bearing bracket 14, as shown most clearly in Figs. 7 to 10, inclusive, of the drawings. In order to limit the movements of the hinge parts and links the link 12ª is preferably provided with a second link 12ᵈ, having a slot 12ᵉ at its outer end connected to a bearing element or bolt 12ᶠ, in the short arm or end of the bow 12, thereby supporting such bow when moved to a substantially vertical position, as shown in Fig. 8 of the drawings. When such front swivelly connected bow is thus raised it is apparent that the same may be moved rearwardly with the attached front end of the top covering to come into engagement with a second bow 11, the links 12ª and 11ª permitting such bows to be gathered and moved rearwardly over the wider portions of the outwardly curved top rails by taking the dotted line positions shown in Figs. 7 and 11 of the drawings, respectively.

When it is desired to collapse the top, the front floating bow 12 is initially detached from the moving clamping and locking mechanism at the front and is then moved rearwardly along the top rails, these bows being gathered together with the attached top covering, the bearing brackets 14 being moved into the guide slots of the stub arms 5ª, and being supported thereon after which the top props 6 may be broken and the top rails 5 be collapsed and folded upon themselves at the rear of the vehicle, as shown by dotted lines in Fig. 3 of the drawings. In putting up the top the main bow 2 is elevated to its proper position through the medium of the top props 6, after which the top rails 5 may be expanded and straightened out, the front end of the top rails or cross member 5 being adapted to detachably connect with and be supported upon a suitable relatively fixed front support, such for example as the upright standards 7 of the windshield, the intermediate hinged connection 5ᶜ being held in proper position by any suitable and convenient latching device, after which the bows 12, 11, 10 and 9 with the attached top covering may be drawn forwardly to resume their original position.

As a means of moving the front floating bow 12 longitudinally when in its normal or horizontal position and relatively of the relatively fixed front support consisting, in the present instance, of the cross member 5ᵈ and the subjacent standards 7 of the windshield, suitable front bow actuating and top stretching mechanism is interposed between the front bow and the support, said moving and locking means, in the present instance, consisting of horizontally extending levers 15, pivotally mounted or fulcrumed at 15ª, the bearings 15ª, in the present instance, being mounted in brackets 15ᵇ, on the inner sides of the front bow 12.

When the front floating bow is moved downwardly, the free ends 15ᶜ of the levers are adapted to engage the brackets 15ᵈ at the inner sides of the top rails, as shown by dotted lines in Fig. 6 of the drawings, and as the levers are moved forwardly the front bow 12 will be moved to the full line position thereby stretching the top longitudinally after which the handle ends of the levers may be dropped into the keeper or latch brackets 15ᵉ.

It will be seen upon reference to Fig. 1 of the drawings that the top rails and floating bows and their various connections are concealed beneath and covered by the top covering 8 and back section or curtain 3, and it should also be understood that instead of the top props 6 being arranged on the outside, as shown in Figs. 3 and 4 of the drawings, such top props may be arranged on the inside, as shown in Figs. 1 and 2 of the drawings.

From the foregoing description, taken in connection with the accompanying drawings, the operation and advantages of my invention will be readily understood.

Having thus described one of the embodiments of my invention, without having attempted to set forth all the forms in which it may be made, or all the modes of its use, what I claim and desire to secure by Letters Patent, is,—

1. In a vehicle top, an approximately U-shaped top supporting bow having its sides provided with stub rails having guide slots, top rails pivoted on said stub rails and extending forwardly therefrom and floating cross bows slidably connected to said top rails and adapted to be gathered and supported on said stub rails.

2. In a vehicle top, a main top supporting bow having sides provided with stub rail bearing brackets having guide slots, top rails pivoted on said bearing brackets and extending forwardly, and floating bows slidably connected to said top rails and adapted to be initially gathered in front of said top supporting bow independently of said top rails and supported on said stub rail bearing arms.

3. In a collapsible vehicle top, a supporting bow provided with laterally curved collapsible top rails, floating cross bows slidably connected to said top rails, some of said cross bows having swivelling links and one of said cross bows carrying the front end of said top, and actuating and locking means for moving said bow and stretching said top longitudinally.

4. In a collapsible vehicle top, a main supporting bow provided at its sides with pivotally connected collapsible top rails, floating cross bows having link connections slidably connected to said top rails, one of said cross bows being adapted to carry the front end of said top, and means on said last mentioned bow for moving said bow and finally stretching said top longitudinally and fastening said bow in position.

5. In a vehicle top, a main supporting bow having sides provided with stub rails, top rails pivotally connected to the latter and intermediate their ends whereby such top rails may be collapsed and folded rearwardly over said stub rails and a plurality of floating cross bows slidably connected to said top rails and adapted to be initially gathered together and held on said stub rails when said top rails are collapsed.

6. In a vehicle top, a U-shaped supporting bow having its sides provided with forwardly extending relatively fixed guide stub rails, top rails pivotally connected to the latter and intermediate their ends whereby such top rails may be collapsed and folded rearwardly over said guide stub rails and cross bows slidable on said top rails and adapted to be passed over and held on said stub rails prior to collapsing and folding said top rails.

7. A vehicle top, comprising a top support, curved top rails carried by the latter, terminating at their front in a cross supporting bar, floating cross bows guided by said top rails, the front cross bows being provided with links variably connecting the same to said curved top rails as shifted on the latter, the first front cross bow being provided with top stretching and locking mechanism operatively connected to said cross supporting bar of said top rails.

8. In a vehicle top, a main supporting bow, curved top rails carried by the latter and terminating at their front in a cross member adapted to support the front of the top, cross bows slidably carried by said top rails some of said cross bows being provided with variable link connections with said top rails and one of said cross bows being adapted to carry the front end of the top, and means on said top front carrying cross bow for finally stretching said top longitudinally and fastening the same.

9. In a vehicle, including a vehicle body having outwardly bowed side walls, a support adapted to carry the rear end of the top, top rails carried by said rear support and extending parallel with and curved to coincide with said outwardly bowed side walls of said vehicle body, and floating cross bows provided with swivelled link connections adapted to assume variable positions to conform to the curvature of said side rails whereby said cross bows may be gathered and moved rearwardly relative to said top rails prior to the collapsing of the latter.

10. In a vehicle top, a main top supporting bow, top rails carried by the latter and laterally curved forwardly to conform to the side sweep of the subjacent vehicle body, said top rails terminating in a cross supporting member at the front, cross bows slidably connected to said top rails, one of said cross bows being connected to the front of the top and having a swivelled link connection with said top rails, and means on said swivelly connected cross bow for engaging said cross supporting member of said top rails whereby said top may be stretched longitudinally and said front bow fastened in position.

11. In a vehicle, the combination with a vehicle body having curved sides, a pivoted support adapted to carry the rear end of the top, collapsible top rails carried by and extending from said rear support and curved to coincide with said subjacent curved side walls of the vehicle body, and floating cross bows slidably connected to said top rails, some of said floating cross bows being provided with swivelled link connections adapted to assume variable positions to conform to the curvature of said side rails whereby said cross bows may be gathered and moved rearwardly relative to said top rails prior to the collapsing of the latter.

In testimony whereof I have affixed my signature.

CHARLES DUMELIN.